United States Patent
He et al.

(10) Patent No.: US 11,106,272 B2
(45) Date of Patent: Aug. 31, 2021

(54) BIOS-BASED USER-SELECTABLE POWER CONTROL

(71) Applicant: Dell Products L.P., Round Rock, TX (US)

(72) Inventors: Qinghong He, Austin, TX (US); Wai-Ming Richard Chan, Austin, TX (US); Umang Kantilal Patel, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 16/246,086

(22) Filed: Jan. 11, 2019

(65) Prior Publication Data

US 2020/0225732 A1 Jul. 16, 2020

(51) Int. Cl.
*G06F 9/44* (2018.01)
*G06F 1/32* (2019.01)
*G06F 1/3296* (2019.01)
*G06F 9/4401* (2018.01)

(52) U.S. Cl.
CPC .......... *G06F 1/3296* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 8,555,051 B2* | 10/2013 | Lo | ....... | G06F 9/44505 713/2 |
| 9,898,067 B2* | 2/2018 | Distefano | ....... | G06F 1/206 |
| 2006/0265610 A1* | 11/2006 | Kim | ....... | G06F 1/3203 713/300 |
| 2009/0177334 A1* | 7/2009 | Artman | ....... | G06F 1/206 700/300 |
| 2012/0017101 A1* | 1/2012 | So | ....... | G06F 1/325 713/300 |
| 2013/0047121 A1* | 2/2013 | Kao | ....... | G06F 9/44505 715/810 |
| 2020/0034141 A1* | 1/2020 | Bilal | ....... | G06F 1/3206 |

* cited by examiner

*Primary Examiner* — Fahmida Rahman
(74) *Attorney, Agent, or Firm* — Norton Rose Fulbright US LLP

(57) ABSTRACT

Power management may be performed in a basic input/output system (BIOS) of an information handling system to provide flexibility in system operation. The BIOS may include a user setting specifying a power level, and that power level used to control a central processing unit (CPU) or other hardware components. For example, the BIOS power level may specify a sustained power setting for the CPU. One example sustained power setting is the PL1 value, which is a fixed value that specifies a thermal design power (TDP) for the CPU. As another example, the power level may specify whether to enable and/or disable a discrete graphics processing unit (GPU) or other hardware component operating from the same battery as the CPU.

14 Claims, 6 Drawing Sheets

BIOS-BASED USER-SELECTABLE POWER CONTROL

FIELD OF THE DISCLOSURE

The instant disclosure relates to power management in information handling systems. More specifically, portions of this disclosure relate to managing power consumption from a basic input/output system (BIOS) of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The hardware components in the information handling system consume power and generate heat when power is consumed. Some information handling systems are designed to work in particular environments. These systems must keep a central processing unit (CPU) and other hardware components at manageable power and thermal levels despite environmental conditions. Such management is critical to prevent damage to the CPU and erroneous operation of the information handling system, such as when the information handling system is subject to extreme environments with high temperatures.

Shortcomings mentioned here are only representative and are included simply to highlight that a need exists for improved electrical components, particularly for information handling systems, such as ruggedized information handling systems constructed to operate in extreme temperatures. Embodiments described herein address certain shortcomings but not necessarily each and every one described here or known in the art. Furthermore, embodiments described herein may present other benefits than, and be used in other applications than, those of the shortcomings described above.

SUMMARY

Power management may be performed in a basic input/output system (BIOS) of an information handling system to provide flexibility in system operation. The BIOS may include a user setting specifying a power level, and that power level used to control a central processing unit (CPU) or other hardware components. For example, the BIOS power level may specify a sustained power setting for the CPU. One example sustained power setting is the PL1 value, which is a fixed value that specifies a thermal design power (TDP) for the CPU. As another example, the power level may specify whether to enable and/or disable a discrete graphics processing unit (GPU) or other hardware component operating from the same battery as the CPU.

Power management of hardware components in the information handling system through the BIOS can be particularly advantageous for certain information handling systems. One example of such systems is ruggedized information handling systems in which the IHS operates in extreme environment conditions. A PL1 value for the processor of the ruggedized information handling system is conventionally set to a fixed value during boot and while the IHS is under control of the BIOS. In these information handling systems, a CPU PL1 value is conventionally set to a low value to ensure the CPU operates within designed power limits even under the most extreme environmental conditions. When the information handling system is operating at normal or low ambient temperatures, rather than the extreme temperatures the ruggedized system is designed for, the CPU has available performance, sometimes referred to as "headroom," that is not being used due to the implemented CPU PL1 value. Thus, the conventional fixed sustained power setting is inefficient for the operating of these ruggedized systems, or other systems with more cooling than needed for the operating conditions. The flexible power management provided in the BIOS according to embodiments of this disclosure allow the information handling system to take advantage of extra thermal capacity at low ambient temperatures. Furthermore, the flexible power management provided in the BIOS can improve battery life of the information handling system by restricting power consumption of hardware components even when the environmental conditions would allow such a CPU setting. Additionally, providing power management options in the BIOS has the advantage of being operating system (OS)/application independent.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1A:
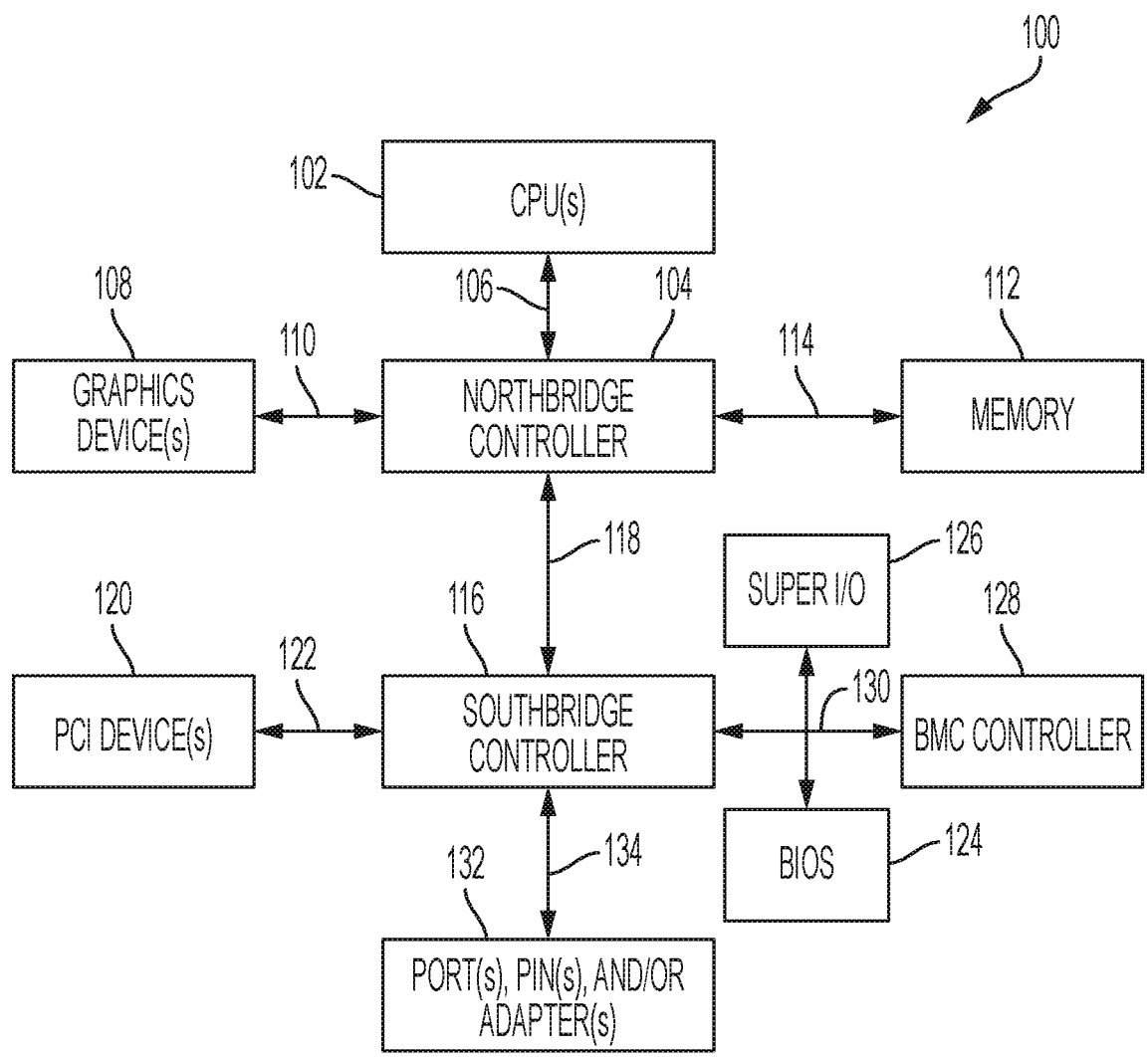
FIG. 1A is a schematic block diagram of an example information handling system according to some embodiments of the disclosure.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHS s attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

BIOS 124 may include non-volatile memory, such as NVRAM, having program instructions stored thereon. The instructions stored on the BIOS may be usable CPU(s) 102 to initialize and test other hardware components and/or to load an Operating System (OS) onto IHS 100, for example during a booting of an information handling system. As such, BIOS 124 may include a firmware interface that allows CPU(s) 102 to load and execute certain firmware. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

Super I/O controller 126 may combine interfaces for a variety of lower bandwidth or low data rate devices. Those devices may include, for example, floppy disks, parallel ports, keyboard and mouse, temperature sensor and fan speed monitoring, etc. IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

When an information handling system is powered up or rebooted, the information handling system may begin a booting process wherein a BIOS (including legacy BIOS and UEFI) may initialize and configure hardware and firmware, prepare the information handling system for booting of the operating system, and boot the operating system. Prior to the operating system loading, there is no software controlling the IHS outside of the BIOS. As described above, there conventionally is no power management implemented in the BIOS, and processor control, such as through a PL1 setting or enabling/disabling of co-processors, such as graphics processors, is unavailable at the BIOS-level. The operational time prior to loading the operating system is generally short and does not require power management. However, providing power management within the BIOS offers several advantages in information handling systems, and in particular to ruggedized information handling systems and other information handling systems with cooling systems designed for higher ambient temperatures than those currently existing around the information handling system. Control may be added to the BIOS to provide power management capability, which allows these systems to take advantage of the additional cooling headroom available. In some embodiments, the user can change a power management setting that causes the BIOS to control the PL1 setting of the CPU and/or enable and/or disable co-processors.

Figure 1B:
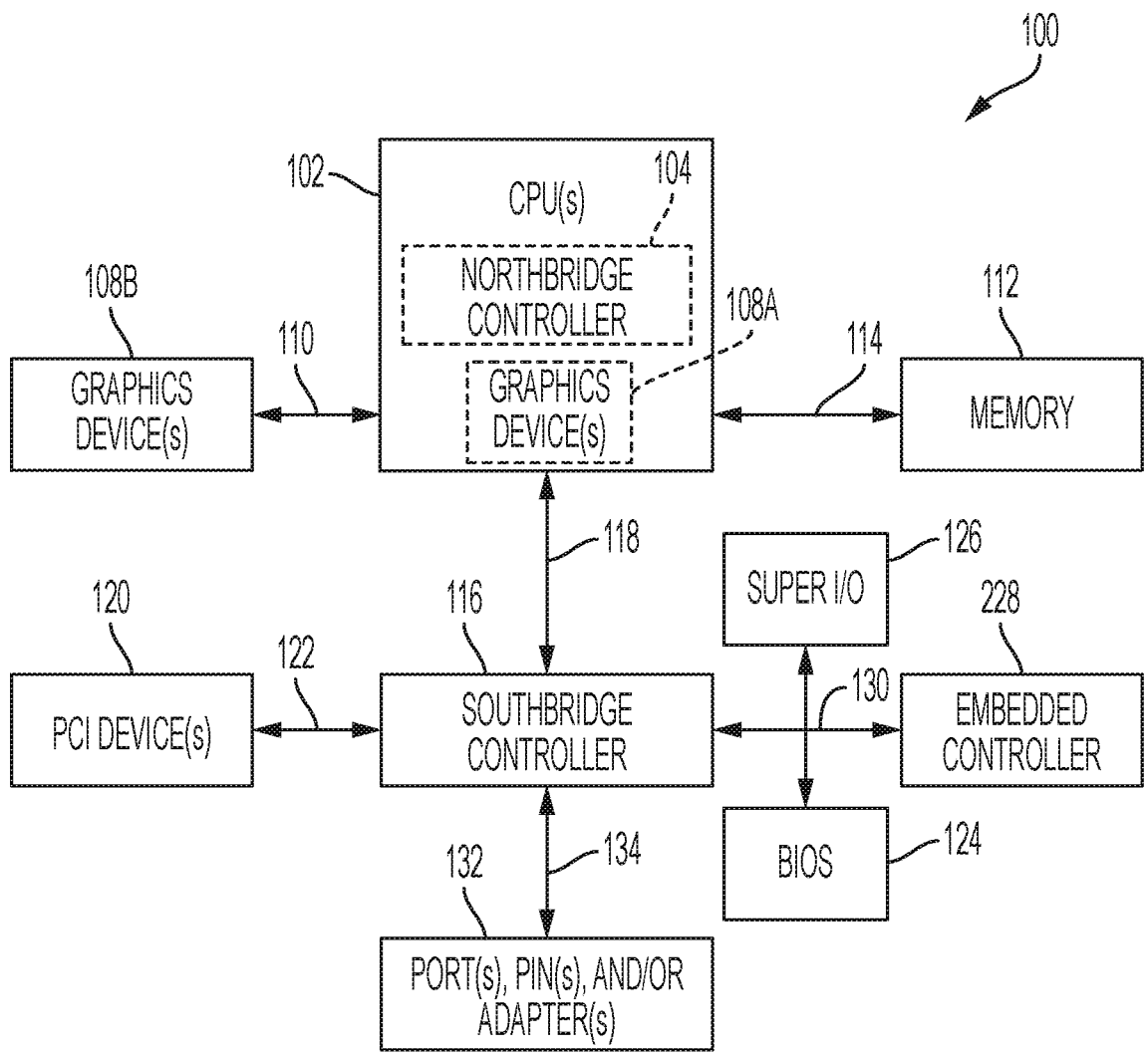
FIG. 1B is a schematic block diagram of an example information handing system according to some embodiments of the disclosure.

The example system of FIG. 1A may be configured as a server or a client device (e.g., a laptop computer). Another configuration for an information handling system is shown in FIG. 1B, which may also be a server or client device. FIG. 1B is a schematic block diagram of an example information handing system according to some embodiments of the disclosure. In FIG. 1B, functionality of the northbridge controller 104 may be integrated into the CPU, such as by being a separate integrated circuit (IC) included in the same package or by being included in a same IC as the CPU 102 logic circuitry, registers, and cache memory. In some embodiments, multiple graphics devices 108A and 108B may be present, with one of the graphics devices 108A integrated into the CPU and another one of the graphics devices 108B external from the CPU. Like the northbridge functionality, the graphics device may be integrated into the CPU, such as by being a separate integrated circuit (IC) included in the same package or by being included in a same IC as the CPU 102 logic circuitry, registers, and cache memory. In some embodiments, there may be zero or two or more integrated graphics devices in the CPU 102. Also as shown in FIG. 1B, the BMC controller 128 in any embodiment may be replaced with an embedded controller (EC) 228.

Figure 2:
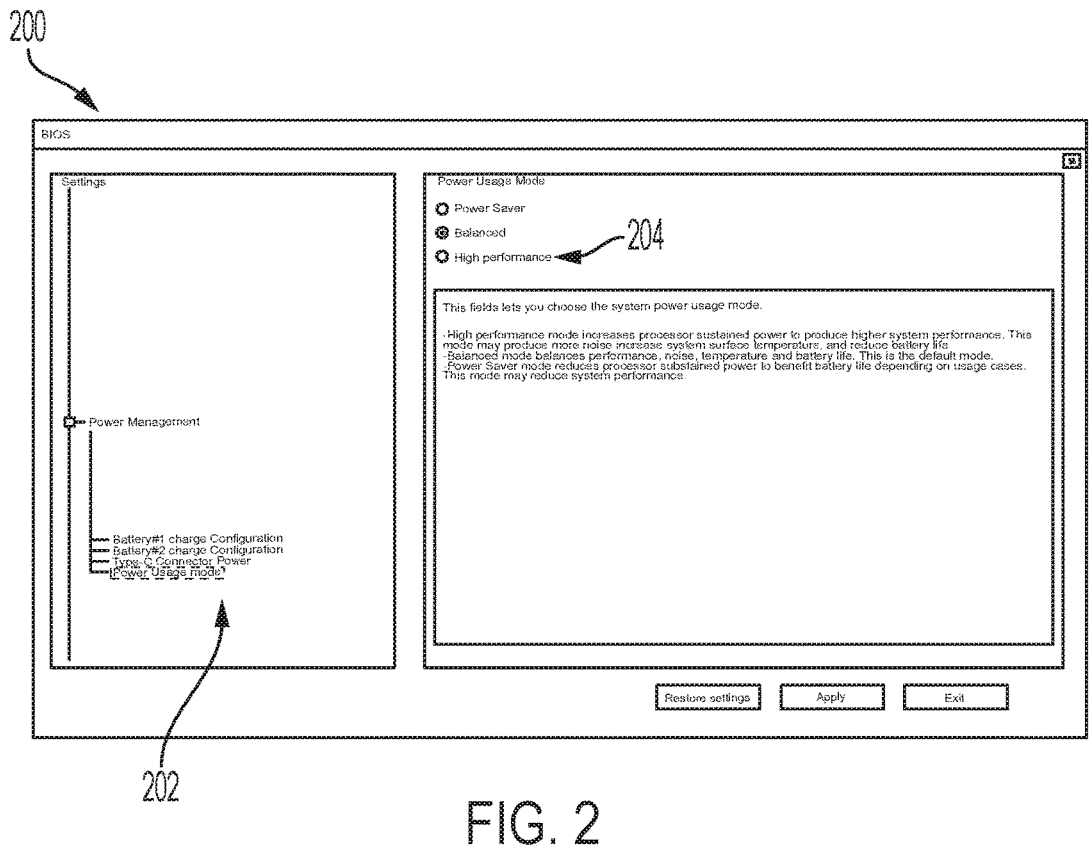
FIG. 2 is a screen shot illustrating a user-adjustable power management setting within the basic input/output system (BIOS) according to some embodiments of the disclosure.

An example BIOS user interface (UI) allowing power management from within the BIOS is shown in FIG. 2. FIG. 2 is a screen shot illustrating a user-adjustable power management setting within the basic input/output system (BIOS) according to some embodiments of the disclosure. A user may interact with the BIOS locally at the physical location of the information handling system or remotely at a physical location separated from the information handling system. The user may be provided with a keyboard, mouse, and/or pen interface to the information handling system. A screen shot 200 illustrates settings 202 for configuring an information handling system during boot. One such setting 204 controls power management within the information handling system. The setting 204 may be, for example, a direct input for the sustained power setting of the CPU through a text box for entering a numerical PL1 value. The setting 204 may alternatively be, for example, a list of items from a table corresponding to predetermined or calculable determined. The list of items may include options such as "High Performance," "Balanced," and "Power Saver," each of which corresponds to a certain sustained power setting and/or other settings that can be obtained from a lookup table. In some embodiments such a lookup table may have additional information for identifying a particular sustained power setting and/or other settings for an information handling system. The other information may indicate a dependence for power management settings on additional parameters such as system configuration and known location of the information handling system. The setting 204 may alternatively be, as another example, a slider bar for selecting between a plurality of profiles for power management.

Figure 3:
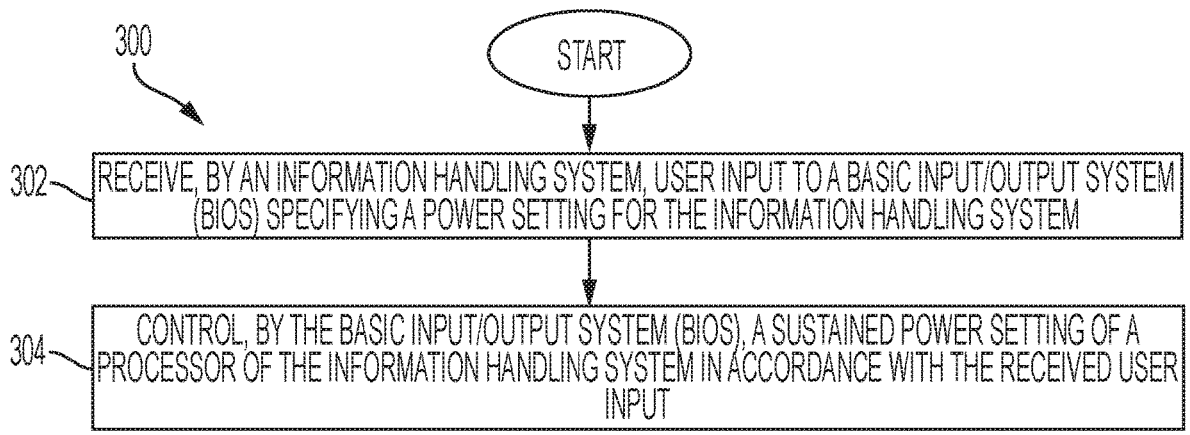
FIG. 3 is a flow chart illustrating power management from a BIOS according to some embodiments of the disclosure.

The user selected value of setting 204 may correspond to at least a sustained power setting. The BIOS may transmit instructions to a processor and/or other hardware components to control power consumption based on the setting 204. An example method for performing power management in an information handling system is shown in FIG. 3. FIG. 3 is a flow chart illustrating power management from a BIOS according to some embodiments of the disclosure. First in method 300, the block 302 may begin with receiving user input to a BIOS specifying a power setting for the IHS. Next, at block 304 a sustained power setting of a processor is controlled to permanently or temporarily reduce power consumption. Additional power management settings may also be controlled at block 304 with the sustained power setting. For example, the power management settings may specify the enabling/disabling of co-processors, such as artificial intelligence (AI) processors, graphics processing units (GPUs), math co-processors, security co-processors, and the like. Additional power management settings controlled at block 304 may include thermal management settings, such as specifying one or more fan speed profiles for one or more cooling fans such as processor fans and system fans.

Figure 4:
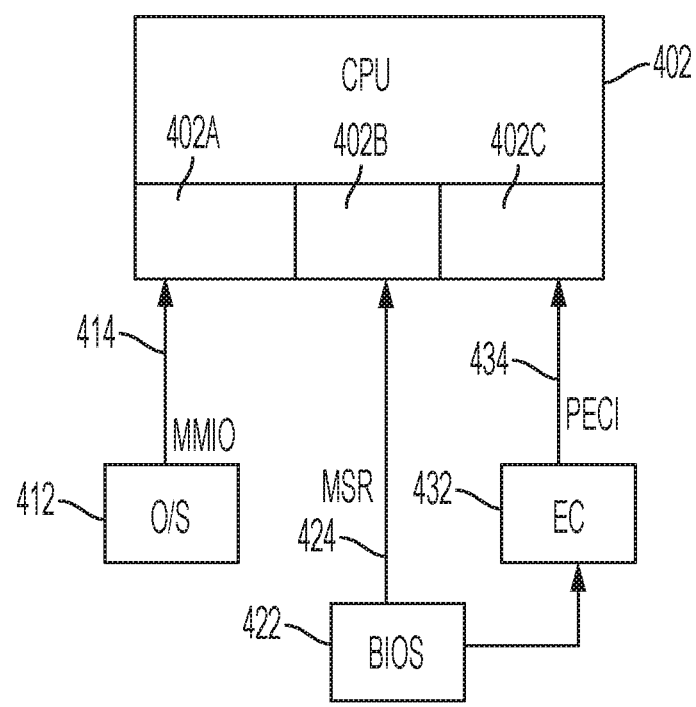
FIG. 4 is a block diagram illustrating sustained power setting control signals for a processor according to some embodiments of the disclosure.

The sustained power setting may be controlled by the BIOS through one or more signal paths in the information handling system. FIG. 4 is a block diagram illustrating sustained power setting control signals for a processor according to some embodiments of the disclosure. A CPU 402 of an information handling system may have three registers 402A-C available and select the lowest or highest value of the three registers for a sustained power limit. Those three registers 402A-C may be written through different signal paths 414, 424, and 434. For example, register 402A may be written by an operating system 412, such as through a MMIO bus 414, another register 402C may be written by an embedded controller (EC) 432, such as through a PECI bus 434, and a model specific register (MSR) power register 402B may be written by the BIOS 422, such as through a bus 424 that provides a pathway configured to allow the BIOS 422 to send updates to the sustained power setting of the CPU 402. Limiting a sustained power setting from the operating system 412 through the MMIO bus 414 requires special software and operating system drivers, which may cause security concerns and/or other administrative concerns related to the hosting and maintaining of additional software. In some embodiments, hardware configuration of a sustained power setting from the BIOS 422 may be performed through the bus 424. In some embodiments, hardware configuration of a sustained power setting from the BIOS 422 may additionally or alternatively be controlled by instructing the EC 432 to set the sustained power setting value through the PECI bus 434, if such an interface is available through the EC 432. Other co-processors, such as graphics processing units (GPUs), can be controlled by similar techniques or other techniques. For example, communication with a discrete GPU to enable or disable the GPU or control power levels of the GPU may be through GPU input/output (I/O) registers or memory-mapped input/output (MMI/O) registers. In some embodiments, enabling or disabling a discrete component may be performed by gating power to the dGPU (discrete Graphics Processing Unit) through standard PCIe control, if available, or through a general-purpose input/output (GPIO).

Figures 5, 6, 7:
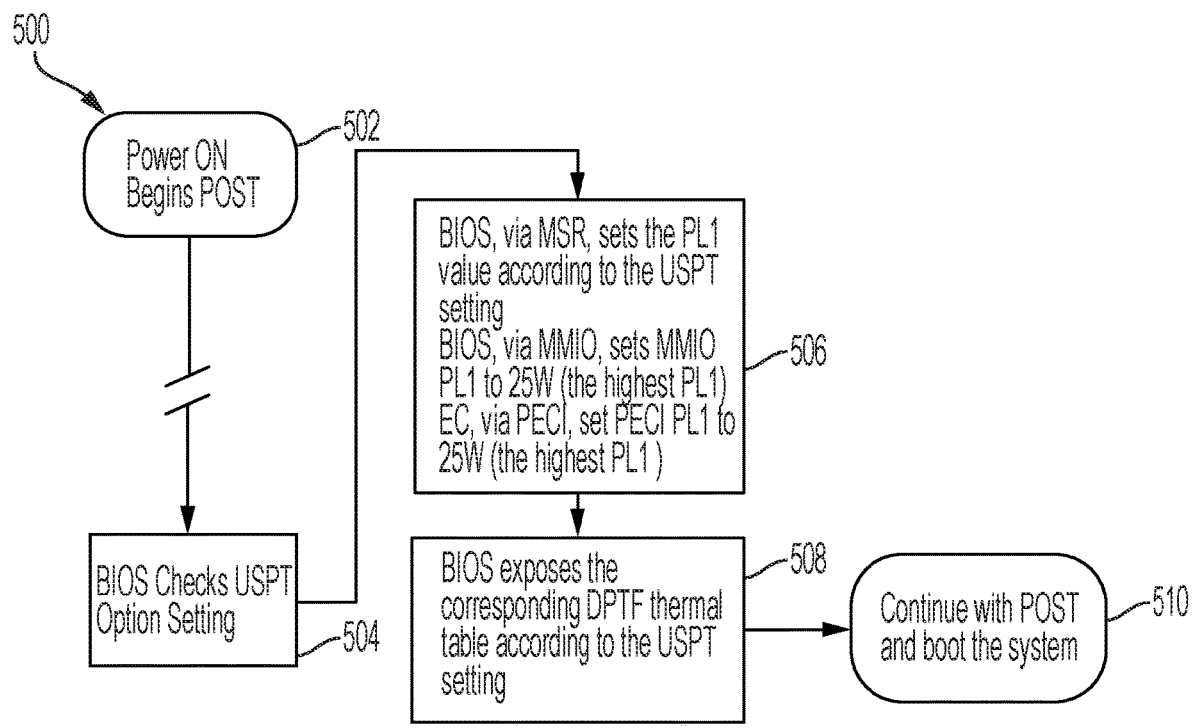
FIG. 5 is a flow chart illustrating a BIOS-based power management technique according to some embodiments of the disclosure.
FIG. 6 is a table illustrating example power management settings for user-selected profiles according to some embodiments of the disclosure.
FIG. 7 is a table illustrating example power management settings for user-selected profiles according to some embodiments of the disclosure.

FIG. 5 is a flow chart illustrating a BIOS-based power management technique according to some embodiments of the disclosure. The method 500 begins with the information handling system powering on at block 502 and beginning a power-on self-test (POST). During the POST or after the POST, the BIOS checks a user-selectable power table (USPT) option setting to determine a sustained power setting for the CPU and/or other power and thermal management settings for the information handling system. The USPT option setting may be selected by a user in the BIOS screen illustrated in FIG. 2. The particular PL1 value and other thermal and power settings may be determined by matching the option setting to a look-up table, such as the example tables provided in FIG. 6 and FIG. 7. At block 506, the BIOS sets the PL1 value for the CPU according to the look-up table and the USPT option setting. The BIOS may set the PL1 value through the MSR bus and/or by transmitting a command to the EC to set the PL1 value through the PECI bus. In some embodiments, the information handling system may also initialize the other PL1 registers in the CPU with the fixed TDP rating for the CPU, such as by having the BIOS set the MMIO PL1 value to a highest available PL1 (e.g., 25 Watts) and having the EC set the PECI PL1 value to a highest available PL1 (e.g., 25 Watts). At block 508, the BIOS exposes a corresponding Dynamic Platform Thermal Framework (DPTF) thermal table according to the USPT setting. DPTF is a is a technology used in operating system (OS) run-time power and thermal management, although other technologies and techniques for power and thermal management may alternatively or additionally be triggered by the USPT setting. At block 510, the information handling system continues the boot process, such as by completing the POST and loading the operating system kernel.

The user-selectable power setting in the BIOS, such as shown in the example of FIG. 2, may be correlated with particular settings and values for the information handling system through a user-selectable power table (USPT). Examples of a USPT are shown in FIG. 6 and FIG. 7. FIG. 6 is a table illustrating example power management settings for user-selected profiles according to some embodiments of the disclosure. A table 600 correlates a BIOS setting 602 with a PL1 value 604 for a CPU and an enable setting 606 for whether a discrete GPU is enabled. In one embodiment, the PL1 value may increase for higher performance user selections to allow the processor to operate at higher power levels. For example, the CPU may operate at 10 Watts in a "Power Saver" setting, at 15 Watts in a "Balanced" setting, and at 20 Watts at a "High Performance" setting. The USPT 600 allows the BIOS to present user-recognizable options while shielding the user from having to understand detailed CPU operation. That is, the user does not need to specify the PL1 value, but instead is allowed to choose from descriptive labels that are correlated to specific PL1 values. In some embodiments, an advanced user may be allowed to input a PL1 value in the BIOS rather than use a user-selectable power table (USPT). The enable setting 606 may determine whether a discrete graphics component is enabled if the information handling system is so equipped with such a discrete graphics component. For example, in the "High Performance" setting the discrete GPU is enabled, but at the "Balanced" and "Power Saver" settings the discrete GPU is disabled. The same enable setting 606 may determine whether other co-processors or hardware components are enabled or disabled. In some embodiments, additional enable settings are configured in the table 600 to allow separate enabling and disabling of the hardware components at different BIOS settings.

The table 600 may contain additional information for the user-selectable profiles. In some embodiments, the table 600 may also include fan speed profiles and/or temperature thresholds for fan speeds such that thermal management is controlled differently at the various BIOS settings. Such fan speed profiles and/or thresholds may be exposed at block 508 of method 500. In some embodiments, the table 600 may include a graphics power setting for the graphics processor of the information handling system that sets a limit on a sustained power setting for the discrete GPU. In some embodiments, the table 600 may include a total system power setting that limits the combined power of the CPU and the GPU and/or other co-processors within the information handling system.

In another embodiment of the user-selectable power tables (USPTs), the USPT may include different profiles for different system configurations. For example, when the same information handling system is sold with different configuration options, such as the optional inclusion of a particular kind of processor or the optional inclusion of discrete graphics units, the USPT may include different profiles for each of the possible user-selectable BIOS settings and each of the possible configurations. An example of such a USPT is shown in FIG. 7. FIG. 7 is a table illustrating example power management settings for user-selected profiles according to some embodiments of the disclosure. A table 700 includes system configurations 702, 704, and 706 corresponding to three different processor options for the information handling system. The table 700 includes power management profiles 712, 714, and 716 corresponding to BIOS settings for "Power Saver," "Balanced," and "High Performance," respectively. Each of the profiles 712, 714, and 716 correspond to a CPU PL1 value and a discrete GPU enable setting for each possible configuration 702, 704, and 706. Table 700 allows the power management profile to take into consideration the information handling system configuration. For example, when a discrete GPU is present and enabled the CPU PL1 value may be reduced to take into consideration the additional power consumed by the discrete GPU, whereas configurations without the discrete GPU can operate at higher PL1 values in the same power management profile. In table 700, a PL1 value for configuration 704 without a discrete GPU allows a CPU PL1 value of 25 in the "High Performance" profile 716 as in configuration 704, but only allows a CPU PL1 value of 20 in the "High Performance" profile 716 when a discrete GPU is present and enabled as in configuration 706. Tables, such as those illustrated in FIG. 6 and FIG. 7, may be used to perform mapping of the received user input in the BIOS, which may be a user-friendly descriptive text, to the sustained power setting and/or other power or thermal settings. The mapped values are then transmitted to the appropriate components, such as by transmitting a corresponding PL1 value to the CPU from the BIOS through the MSR bus.

Figure 8:
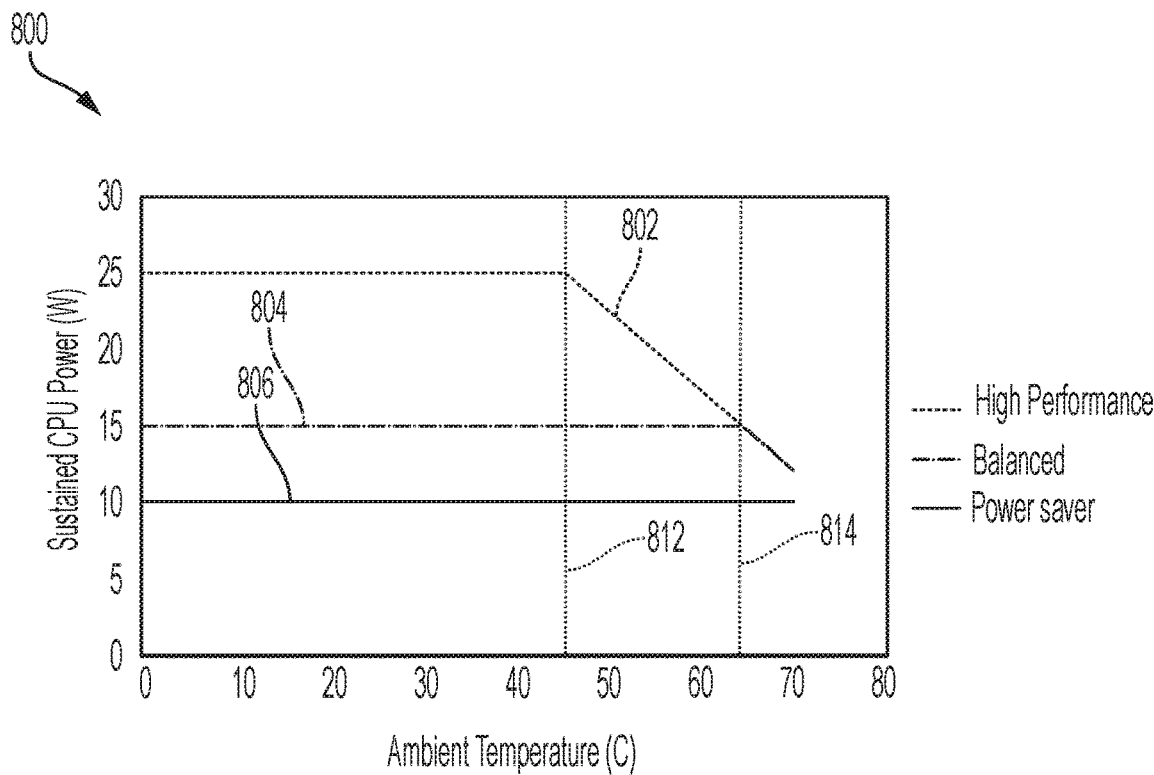
FIG. 8 is a graph illustrating the effect of the sustained power setting on processor operation according to embodiments of the disclosure.

The sustained power setting of the CPU effectively limits the power consumed by the CPU as shown in FIG. 8. FIG. 8 is a graph illustrating the effect of the sustained power setting on processor operation according to embodiments of the disclosure. A graph 800 illustrates the effect of the sustained power setting on CPU operation. A line 802 shows that at the "High Performance" profile, the CPU is allowed to operate at a high-power setting when the ambient temperature is below a threshold temperature 812, after which the CPU sustained power is reduced. A line 804 shows that at the "Balanced" profile, the CPU is restricted to a lower power setting despite having sufficient headroom to operate at a higher power level. The BIOS-based control of the PL1 value restricts CPU power consumption even before loading an operating system. In the "Balanced" setting, thermal limits may still cause the sustained power to be reduced beyond threshold temperature 814. A line 806 shows that at the "Power Saver" profile, the CPU is further restricted to an even lower power setting despite having sufficient headroom to operate at a higher power level. In one embodiment, the "Power Saver" or otherwise lowest power setting may be low enough that there is no further reduction in sustained power consumption regardless of ambient temperature. That is, the "Power Saver" profile is conservative even for the most extreme possible ambient temperatures. Such a setting may be useful for ruggedized computers that are used in such extreme environments or may be useful for when a user desires the longest battery life. When that same ruggedized computer is not operating in the extreme environment, the profile may be switched to "Balanced" or "High Performance" to take advantage of the cooler ambient temperatures and the available system cooling capability. Implementing the power setting in the BIOS can provide further battery savings and improved device safety by implementing power settings immediately, without waiting for an operating system to load, applicable drivers to load, and software to begin executing that would manage the CPU sustained power setting. Implementing the power setting in the BIOS can also provide administrators the opportunity to lock the setting more securely than when the power control is implemented in software. Software packages can have security holes that allow circumventing restrictions, such as a power limit, or may allow inadvertent changes to the power profile. If the power profile were changed while the system is in an extreme environment then the system may be damaged. The BIOS value can be set by an administrator and the BIOS then password protected to prevent users from inadvertently or intentionally changing the power profile.

Figure 9:
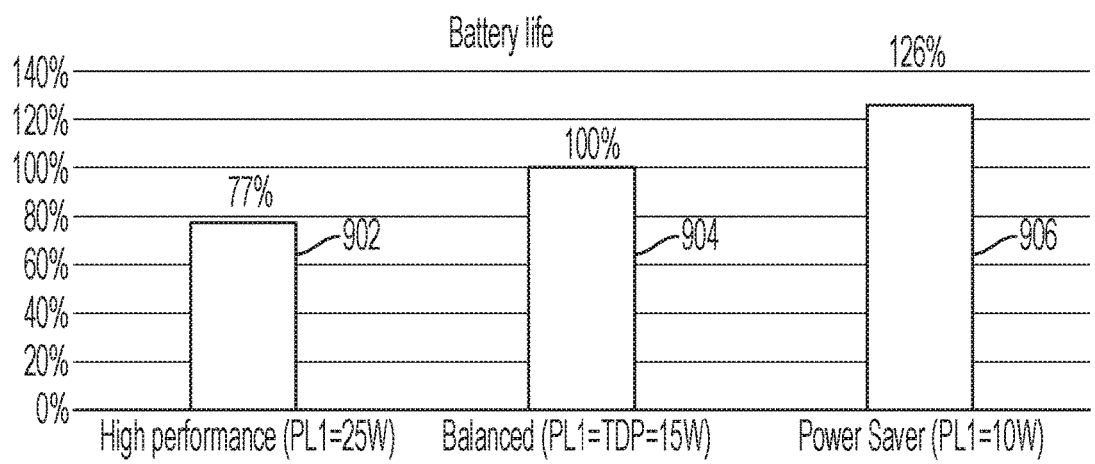
FIG. 9 is a graph illustrating the effect of the sustained power setting on battery life according to embodiments of the disclosure.

The battery life made possible by the BIOS-based USPTs is shown in the graph of FIG. 9. FIG. 9 is a graph illustrating the effect of the sustained power setting on battery life according to embodiments of the disclosure. A bar 904 illustrates the battery life when operating a CPU of a test system at a rated TDP of 15 Watts. In a "High Performance" setting, the CPU PL1 value may be set above the rated value, which in this example is 25 Watts. This "High Performance" setting increases performance but reduces battery life such that the available operating duration shown as bar 902 is only 77% that of the "Balanced" battery life of bar 904. When the operating PL1 of bar 906 is higher than the rated value of bar 904, operating in such a state may be referred to as "overclocking." In a "Power Saver" setting, the CPU PL1 value is reduced in the BIOS to below the rated TDP of the processor to 10 Watts. This "Power Saver" setting decreases performance in some circumstances but increases battery life such that the available operating duration shown as bar 906 is 126% that of the "Balanced" battery life of bar 904.

The schematic flow chart diagram of FIG. 3 and FIG. 5 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium.

Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to or implemented on different kinds of processors, such as graphics processing units (GPUs), central processing units (CPUs), security processors, video processors, CODEC s, encryption processors, co-processors, and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
   operating, by a ruggedized information handling system, a processor at a default power setting lower than another power setting available for the processor, the default power setting corresponding to operations within designed power limits for the ruggedized information handling system under extreme environmental conditions;
   receiving, by the ruggedized information handling system, a user input directly into a basic input/output system (BIOS) user interface specifying a power setting for the ruggedized information handling system above the default power setting for operating in normal environmental conditions, wherein the user input specifying the power setting comprises specifying a value corresponding to a selected entry in a user-selectable power table (USPT) corresponding to a sustained power setting for a processor, a control setting for a graphics processor, and a fan speed profile;
   controlling, by the basic input/output system (BIOS), the sustained power setting of the processor of the ruggedized information handling system in accordance with the selected entry in the user-selectable power table (USPT) corresponding to the received user input;
   controlling, by the basic input/output system (BIOS), an enabling of the graphics processor of the ruggedized information handling system in accordance with the selected entry in the user-selectable power table (USPT) corresponding to the received user input; and
   controlling, by the basic input/output system (BIOS), a fan speed profile of the ruggedized information handling system in accordance with the selected entry in the user-selectable power table (USPT) corresponding to the received user input.

2. The method of claim 1, wherein the graphics processor of the ruggedized information handling system comprises a discrete graphics processor.

3. The method of claim 1, further comprising controlling, by the basic input/output system (BIOS), a graphics power setting for the graphics processor of the ruggedized information handling system in accordance with the selected entry in the user-selectable power table (USPT) corresponding to the received user input.

4. The method of claim 1, wherein the fan speed profile of the ruggedized information handling system comprises a setting for one or more fans in the ruggedized information handling system.

5. The method of claim 1, wherein the step of controlling the sustained power setting comprises transmitting a signal corresponding to the sustained power setting to the processor by setting a model specific register (MSR) of the processor.

6. The method of claim 1, wherein the step of controlling the sustained power setting comprises transmitting a signal corresponding to the sustained power setting to the processor through an embedded controller of the ruggedized information handling system.

7. The method of claim 1, wherein the step of receiving the user input and the step of controlling the sustained power setting are performed without software separate from the basic input/output system (BIOS).

8. An apparatus, comprising:
a processor configured to perform steps comprising:
operating, by a ruggedized information handling system, the processor at a default power setting lower than another power setting available for the processor;
receiving, by a ruggedized information handling system, an user input directly into a basic input/output system (BIOS) user interface specifying a power setting for the ruggedized information handling system above the default power setting for operating in normal environmental conditions, wherein the user input specifying the power setting comprises specifying a value corresponding to a selected entry in a user-selectable power table (USPT) corresponding to a sustained power setting for a processor, a control setting for a graphics processor, and a fan speed profile;
controlling, by the basic input/output system (BIOS), the sustained power setting of the processor of the ruggedized information handling system in accordance with the selected entry in the user-selectable power table (USPT) corresponding to the received user input;
controlling, by the basic input/output system (BIOS), an enabling of the graphics processor of the ruggedized information handling system in accordance with the selected entry in the user-selectable power table (USPT) corresponding to the received user input; and
controlling, by the basic input/output system (BIOS), a fan speed profile of the ruggedized information handling system in accordance with the selected entry in the user-selectable power table (USPT) corresponding to the received user input.

9. The apparatus of claim 8, wherein the step of controlling the sustained power setting comprises transmitting a signal corresponding to the sustained power setting to the processor by setting a model specific register (MSR) of the processor.

10. The apparatus of claim 8, wherein the step of controlling the sustained power setting comprises transmitting a signal corresponding to the sustained power setting to the processor through an embedded controller of the ruggedized information handling system.

11. The apparatus of claim 8, wherein the processor is further configured to perform steps comprising controlling, by the basic input/output system (BIOS), a graphics power setting for the graphics processor of the ruggedized information handling system in accordance with the control setting for the graphics processor.

12. An ruggedized information handling system, comprising:
a processor;
a basic input/output system (BIOS); and
a model specific register (MSR) within the processor and configured to receive updates from the basic input/output system (BIOS) to provide control of the processor from the BIOS,
wherein the basic input/output system (BIOS) is configured to perform steps comprising:
operating, by a ruggedized information handling system, the processor at a default power setting lower than another power setting available for the processor;
receiving an user input directly into a basic input/output system (BIOS) user interface specifying a power setting for the ruggedized information handling system above the default power setting for operating in normal environmental conditions, wherein the user input specifying the power setting comprises specifying a value corresponding to a selected entry in a user-selectable power table (USPT) corresponding to a sustained power setting for a processor, a control setting for a graphics processor, and a fan speed profile;
controlling the sustained power setting of the processor of the ruggedized information handling system in accordance with the selected entry in the user-selectable power table (USPT) corresponding to the received user input by transmitting a signal through the model specific register (MSR) register to the processor;
controlling, by the basic input/output system (BIOS), an enabling of the graphics processor of the ruggedized information handling system in accordance with the selected entry in the user-selectable power table (USPT) corresponding to the received user input; and
controlling, by the basic input/output system (BIOS), a fan speed profile of the ruggedized information handling system in accordance with the selected entry in the user-selectable power table (USPT) corresponding to the received user input.

13. The ruggedized information handling system of claim 12, wherein the step of controlling the enabling of the graphics processor is performed by gating power to the graphics processor in accordance with the selected entry in the user-selectable power table (USPT) corresponding to the received user input.

14. The ruggedized information handling system of claim 12, wherein the step of controlling the sustained power setting of the processor comprises setting a PL1 value corresponding to the received user input in the model specific register (MSR) of the processor.

* * * * *